United States Patent
DeCusatis et al.

(10) Patent No.: US 9,614,930 B2
(45) Date of Patent: *Apr. 4, 2017

(54) VIRTUAL MACHINE MOBILITY USING OPENFLOW

(71) Applicant: International Business Machines Corporation, Armonk, NY (US)

(72) Inventors: Casimer DeCusatis, Poughkeepsie, NY (US); Rajaram B. Krishnamurthy, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,457

(22) Filed: Sep. 30, 2014

(65) Prior Publication Data
US 2015/0019741 A1    Jan. 15, 2015

Related U.S. Application Data

(63) Continuation of application No. 13/834,502, filed on Mar. 15, 2013.

(51) Int. Cl.
| | |
|---|---|
| *G06F 15/16* | (2006.01) |
| *H04L 29/08* | (2006.01) |
| *G06F 9/455* | (2006.01) |

(52) U.S. Cl.
CPC .......... *H04L 67/34* (2013.01); *G06F 9/45558* (2013.01); *H04L 67/10* (2013.01); *G06F 2009/4557* (2013.01)

(58) Field of Classification Search
CPC ...... G06F 15/16; G06F 15/161; G06F 15/163; G06F 15/167; G06Q 10/10; G06Q 10/107;

(Continued)

(56) References Cited

U.S. PATENT DOCUMENTS

| | | | |
|---|---|---|---|
| 5,694,390 A | 12/1997 | Yamato | |
| 5,905,711 A | 5/1999 | Chiussi | |

(Continued)

FOREIGN PATENT DOCUMENTS

| | | |
|---|---|---|
| CN | 101313278 A | 11/2008 |
| CN | 101335710 A | 12/2008 |

(Continued)

OTHER PUBLICATIONS

Anonymous; "Intelligent VM Migration Based on Relative VM Priority and Relative Suitability of Migration Target"; http://priorartdatabase.com/IPCOM/000201632; Nov. 16, 2010, 3 pages.

(Continued)

*Primary Examiner* — Ryan Jakovac
*Assistant Examiner* — Da T Ton
(74) *Attorney, Agent, or Firm* — Cantor Colburn LLP; Steven Chiu

(57) ABSTRACT

A method for migrating virtual machines (VMs) that includes creating a temporary storage area. The temporary storage area is created by a controller in a network that is in a first state. The configuration data for a VM is stored in the temporary storage area. The network is provisioned from the first state to a second state. The provisioning is by the controller and based on network locations of a source server and a target server. A message is transmitted to the target server. The message includes a request to migrate the VM from the source server to the target server, and an address of the temporary storage area. It is determined that the migration has completed and the temporary storage area is removed based on the determining that the migrant has completed.

13 Claims, 4 Drawing Sheets

(58) Field of Classification Search
CPC ...... G06Q 50/01; H04N 21/4788; H04N 7/15;
H04N 7/152; H04N 7/155; H04N 7/157;
H04W 4/02; H04W 4/06; H04W 4/08;
H04W 4/10; H04W 4/12; H04W 4/14;
H04W 4/16; H04W 4/18; H04W 4/20;
H04W 4/203; H04W 4/206
USPC .............................. 709/204–211, 223–232
See application file for complete search history.

(56) References Cited

U.S. PATENT DOCUMENTS

| | | | |
|---|---|---|---|
| 5,966,546 A | 10/1999 | Thomas | |
| 6,094,418 A | 7/2000 | Soumiya et al. | |
| 6,208,619 B1 | 3/2001 | Takeuchi | |
| 6,356,944 B1 | 3/2002 | McCarty | |
| 6,504,818 B1 | 1/2003 | Levine | |
| 6,504,821 B2 | 1/2003 | Berger | |
| 6,795,399 B1 | 9/2004 | Benmohamed et al. | |
| 6,813,246 B1 | 11/2004 | Phan et al. | |
| 6,947,380 B1 | 9/2005 | Yip et al. | |
| 6,975,592 B1 | 12/2005 | Seddigh | |
| 7,187,652 B2 | 3/2007 | Lee et al. | |
| 7,234,073 B1 | 6/2007 | Roytman et al. | |
| 7,289,453 B2 | 10/2007 | Riedel et al. | |
| 7,408,876 B1 | 8/2008 | Gupta | |
| 7,765,328 B2 | 7/2010 | Bryers et al. | |
| 7,949,893 B1 | 5/2011 | Knaus et al. | |
| 7,978,607 B1 | 7/2011 | Halabi et al. | |
| 8,069,139 B2 | 11/2011 | Garbow et al. | |
| 8,082,466 B2 | 12/2011 | Tanaka et al. | |
| 8,429,282 B1 | 4/2013 | Ahuja | |
| 8,630,307 B2 | 1/2014 | Wu et al. | |
| 8,724,470 B2 | 5/2014 | Yi et al. | |
| 8,762,501 B2 | 6/2014 | Kempf | |
| 8,953,453 B1 | 2/2015 | Xiao et al. | |
| 2001/0056459 A1 | 12/2001 | Kurose | |
| 2002/0073354 A1 | 6/2002 | Schroiff et al. | |
| 2002/0159386 A1 | 10/2002 | Grosdidier et al. | |
| 2002/0181484 A1 | 12/2002 | Aimoto | |
| 2002/0196749 A1 | 12/2002 | Eyuboglu et al. | |
| 2003/0051187 A1 | 3/2003 | Mashayekhi et al. | |
| 2004/0153866 A1 | 8/2004 | Guimbellot et al. | |
| 2004/0170123 A1 | 9/2004 | Carpenter et al. | |
| 2004/0179476 A1 | 9/2004 | Kim et al. | |
| 2004/0199609 A1* | 10/2004 | Papatla | H04L 29/06 709/220 |
| 2004/0228278 A1 | 11/2004 | Bruckman et al. | |
| 2006/0126509 A1 | 6/2006 | Abi-Nassif et al. | |
| 2006/0187874 A1 | 8/2006 | Zaki | |
| 2006/0203828 A1 | 9/2006 | Kumazawa | |
| 2006/0209695 A1 | 9/2006 | Archer et al. | |
| 2006/0215550 A1 | 9/2006 | Malhotra | |
| 2007/0081454 A1 | 4/2007 | Bergamasco et al. | |
| 2007/0183332 A1 | 8/2007 | Oh | |
| 2007/0204266 A1 | 8/2007 | Beaty et al. | |
| 2007/0220121 A1* | 9/2007 | Suwarna | G06F 9/4856 709/220 |
| 2007/0263540 A1 | 11/2007 | Charzinski et al. | |
| 2008/0137669 A1 | 6/2008 | Balandina et al. | |
| 2008/0192752 A1 | 8/2008 | Hyslop et al. | |
| 2008/0225713 A1 | 9/2008 | Tychon et al. | |
| 2008/0298248 A1 | 12/2008 | Roeck et al. | |
| 2009/0052326 A1 | 2/2009 | Bergamsco et al. | |
| 2009/0089609 A1 | 4/2009 | Baba | |
| 2009/0092046 A1 | 4/2009 | Naven | |
| 2009/0180380 A1 | 7/2009 | Prabhakar et al. | |
| 2009/0203350 A1 | 8/2009 | Gottlieb | |
| 2009/0213861 A1 | 8/2009 | Benner et al. | |
| 2009/0231997 A1 | 9/2009 | Yang et al. | |
| 2009/0232001 A1 | 9/2009 | Gong et al. | |
| 2009/0268614 A1 | 10/2009 | Tay | |
| 2010/0014487 A1 | 1/2010 | Attar et al. | |
| 2010/0027420 A1* | 2/2010 | Smith | G06F 9/4856 370/235 |
| 2010/0027424 A1 | 2/2010 | Radunovic et al. | |
| 2010/0138686 A1 | 6/2010 | Arata et al. | |
| 2010/0142539 A1 | 6/2010 | Gooch | |
| 2010/0146327 A1 | 6/2010 | Takubo | |
| 2010/0166424 A1 | 7/2010 | Nagarajan et al. | |
| 2010/0199275 A1* | 8/2010 | Mudigonda | G06F 9/45558 718/1 |
| 2010/0211718 A1 | 8/2010 | Gratz | |
| 2010/0214970 A1 | 8/2010 | Brunner et al. | |
| 2010/0238803 A1 | 9/2010 | Racz et al. | |
| 2010/0238805 A1 | 9/2010 | Ludwig et al. | |
| 2010/0281178 A1 | 11/2010 | Sullivan | |
| 2010/0302935 A1 | 12/2010 | Zhang et al. | |
| 2010/0303238 A1 | 12/2010 | Cakulev | |
| 2010/0309781 A1 | 12/2010 | Wang et al. | |
| 2011/0026437 A1 | 2/2011 | Roja-Cessa et al. | |
| 2011/0031082 A1 | 2/2011 | Chi | |
| 2011/0032821 A1 | 2/2011 | Morrill et al. | |
| 2011/0085444 A1 | 4/2011 | Ko et al. | |
| 2011/0090797 A1 | 4/2011 | Beecroft | |
| 2011/0135305 A1 | 6/2011 | Barnard et al. | |
| 2011/0137772 A1 | 6/2011 | Davis, III et al. | |
| 2011/0142450 A1 | 6/2011 | Tanzi et al. | |
| 2011/0158647 A1 | 6/2011 | Solheim et al. | |
| 2011/0158658 A1 | 6/2011 | Myslinski et al. | |
| 2011/0179415 A1* | 7/2011 | Donnellan | G06F 9/45558 718/1 |
| 2011/0206025 A1 | 8/2011 | Cadenas | |
| 2011/0211834 A1 | 9/2011 | Ansari et al. | |
| 2011/0242966 A1 | 10/2011 | Van Caenegem et al. | |
| 2011/0256865 A1 | 10/2011 | Sayeed | |
| 2011/0261696 A1 | 10/2011 | Crisan et al. | |
| 2011/0261831 A1 | 10/2011 | Sharma et al. | |
| 2011/0271007 A1 | 11/2011 | Wang et al. | |
| 2011/0273988 A1 | 11/2011 | Tourrilhes et al. | |
| 2011/0283016 A1 | 11/2011 | Uchida | |
| 2011/0286324 A1 | 11/2011 | Bellagamba et al. | |
| 2011/0292830 A1 | 12/2011 | Yanggratoke et al. | |
| 2011/0295996 A1 | 12/2011 | Qiu | |
| 2011/0299389 A1 | 12/2011 | Mau et al. | |
| 2011/0305167 A1 | 12/2011 | Koide | |
| 2011/0305288 A1 | 12/2011 | Liu et al. | |
| 2012/0008958 A1 | 1/2012 | Dahlfort et al. | |
| 2012/0014284 A1 | 1/2012 | Ranganathan et al. | |
| 2012/0014693 A1 | 1/2012 | Cheng et al. | |
| 2012/0020361 A1 | 1/2012 | Ueno et al. | |
| 2012/0023231 A1 | 1/2012 | Ueno | |
| 2012/0030306 A1* | 2/2012 | Kami | G06F 3/0617 709/213 |
| 2012/0054079 A1 | 3/2012 | Hayashi | |
| 2012/0063316 A1 | 3/2012 | Ghanwani et al. | |
| 2012/0163175 A1 | 6/2012 | Gupta et al. | |
| 2012/0170477 A1 | 7/2012 | Hieda | |
| 2012/0195201 A1 | 8/2012 | Ishikawa | |
| 2012/0201140 A1 | 8/2012 | Suzuki | |
| 2012/0207175 A1 | 8/2012 | Raman et al. | |
| 2012/0221887 A1 | 8/2012 | Hasson et al. | |
| 2012/0243476 A1 | 9/2012 | Eyuboglu | |
| 2012/0250496 A1 | 10/2012 | Kato | |
| 2012/0287782 A1 | 11/2012 | Lv et al. | |
| 2013/0003735 A1 | 1/2013 | Chao | |
| 2013/0010600 A1 | 1/2013 | Jocha et al. | |
| 2013/0054761 A1 | 2/2013 | Kempf et al. | |
| 2013/0058345 A1 | 3/2013 | Kano | |
| 2013/0124683 A1 | 5/2013 | Watanable | |
| 2013/0144995 A1 | 6/2013 | Ishii | |
| 2013/0159415 A1 | 6/2013 | Kamiya et al. | |
| 2013/0162038 A1 | 6/2013 | Falk et al. | |
| 2013/0176850 A1 | 7/2013 | Mishra | |
| 2013/0205002 A1 | 8/2013 | Wang et al. | |
| 2013/0212578 A1 | 8/2013 | Garg et al. | |
| 2013/0250770 A1 | 9/2013 | Zou et al. | |
| 2013/0258843 A1 | 10/2013 | Kurita | |
| 2013/0258847 A1 | 10/2013 | Zhang et al. | |
| 2013/0266317 A1 | 10/2013 | Wang | |
| 2013/0268686 A1 | 10/2013 | Wang et al. | |
| 2013/0294236 A1 | 11/2013 | Beheshti-Zavareh et al. | |
| 2014/0006630 A1 | 1/2014 | Cai | |
| 2014/0010235 A1 | 1/2014 | Ueno | |

(56) References Cited

U.S. PATENT DOCUMENTS

| | | | |
|---|---|---|---|
| 2014/0016476 A1 | 1/2014 | Dietz | |
| 2014/0016647 A1 | 1/2014 | Yoshida et al. | |
| 2014/0040526 A1 | 2/2014 | Chang et al. | |
| 2014/0092907 A1* | 4/2014 | Sridhar et al. | 370/392 |
| 2014/0108632 A1 | 4/2014 | Narasimha | |
| 2014/0119193 A1 | 5/2014 | Anand et al. | |
| 2014/0126907 A1 | 5/2014 | Hirth et al. | |
| 2014/0169189 A1 | 6/2014 | Kalkunte | |
| 2014/0178066 A1 | 6/2014 | Patel et al. | |
| 2014/0192646 A1 | 7/2014 | Mir | |
| 2014/0198648 A1 | 7/2014 | Kulkarni et al. | |
| 2014/0258774 A1 | 9/2014 | Taylor et al. | |
| 2014/0269319 A1 | 9/2014 | Decusatis et al. | |
| 2014/0301204 A1 | 10/2014 | Koshimizu | |

FOREIGN PATENT DOCUMENTS

| | | |
|---|---|---|
| CN | 101398770 A | 4/2009 |
| CN | 101663590 A | 2/2010 |
| CN | 101677321 A | 3/2010 |
| CN | 101997644 A | 3/2011 |
| CN | 102291389 A | 12/2011 |
| CN | 102546385 A | 7/2012 |
| CN | 102611612 A | 7/2012 |
| EP | 0876023 | 11/1998 |
| GB | 2313268 A | 5/1996 |
| JP | 2011166700 A | 8/2011 |
| WO | 9930462 | 6/1999 |
| WO | 2009113106 A2 | 9/2009 |
| WO | 2011037104 A1 | 3/2011 |
| WO | 2011037148 A1 | 3/2011 |
| WO | 2011065268 A1 | 3/2011 |
| WO | 2011118575 A1 | 9/2011 |
| WO | 2012056816 A | 5/2012 |

OTHER PUBLICATIONS

Anonymous; "Management framework for efficient live migration of virtual machines running migration-aware applications";http://priorartdatabase.com/IPCOM000200260; Oct. 3, 2010, 5 pages.
Curtis, et al. "DevoFlow: Scaling Flow Management for High-Performance Netowrks". SIGCOMM'11, Aug. 15-19, 2011, Toronto, Ontario, Canada.
Egilmez, et al. "Scalable video streaming over OpenFlow networks: An optimization framework for QoS Routing". 2011 18th IEEE International Confernece on Image Processing (ICIP), 2241-2244.
El-Azzab, et al. "Slices isolator for a virtualized openflow node", (2011) First International Symposium on Network Cloud Computing and Applications (NCCA), 121-126.
IBM "Software Defined Networking, A new paradigm for virtual dynamic, flexible networking," IBM Systems and Technology, Oct. 2012, 6 pages.
IBM; "The automatic determination of master-slave relationship between embedded controllers by mearns of a shared hardware access switch"; http://www.ip.com/pubview/IPCOM000020741D; Dec. 11, 2003, 5 pages.
Johnson, RD.et al.; "Detection of a Working Master Controller by a Slave Card"; http://www.ip.com/pubview/IPCOM000099594D; Feb. 1, 1990, 3 pages.
Li, Z., et al. Compatib le TDM/WDM PON using a Single Tunable Optical Filter for both Downstream Wavelength Selection and Upstream Wavelength Generation. IEEE Photonics Technology Letters, vol. 24, No. 10, May 15, 2012. pp. 797-799.
Liu, et al. "Open Flow-based Wavelength Path Control in Transparent Optical networks: a Proof-of-Concept Demonstration" Sep. 2011, 37th European conference and Exhibition on Optical communication (ECOC).
McKeown et al., "OpenFlow: Enabling Innovation in Campus Networks", Mar. 14, 2008, 6 pages.
Notification of Transmittal of the International Search Report and the Written Opinion of the International Searching Authority, or the Declaration; PCT/IB2014/059457; Mailed Jul. 1, 2014, 6 pages.
PCT Notification of Transmittal of the International Search Report and the Written Opinion of the International Searching Authority, or the Declaration, Application No. PCT/IB2014/059459; International Filing Date: Mar. 5, 2014; Date of Mailing: Jun. 30, 2014; 10 pages.
PCT Notification of Transmittal of the International Search Report/Written Opinion of the International Searching Authority, or the Declaration, Application No. PCT/IB2014/059460; International Filing Date: Mar. 5, 2014; Mailed Jun. 30, 2014, 9 pages.
Pfaff, B.et al.; "Open Flow Switch Specification"; www.openflow.org/document/openflow_spec_v1.0.0.pdf; Feb. 28, 2011, 56 pages.
Wang et al., "Dynamic Bandwidth Allocation for Preventing Congestion in Data Center Networks," ISNN 2011, Part III, LNCS 6677, pp. 160-167, 2011.
Yong, S. et al, "XOR Retransmission in Multicast Error Recovery". Networks, 2000 (ICON2000). Proceedings. IEEE International Conference. pp. 336-340.
U.S. Appl. No. 13/833,886, filed Mar. 15, 2013; Non-Final Office Action; Date Mailed: Dec. 17, 2014; 32 pages.
U.S. Appl. No. 13/833,796, filed Mar. 15, 2013; Non-final Office Action ; Date Mailed: Dec. 19, 2014; 31pages.
U.S. Appl. No. 13/833,848, filed Mar. 15, 2013; Notice of Allowance; Date Mailed: Dec. 17, 2014; 28 pages.
U.S. Appl. No. 13/833,848, filed Mar. 15, 2013; Notice of Allowance; Date Mailed: Apr. 3, 2015; 16 pages.
U.S. Appl. No. 13/833,886, filed Mar. 15, 2013; Final Office Action; Date Mailed: Apr. 9, 2015; 19 pages.
U.S. Appl. No. 14/502,043, filed Sep. 30, 2014; Non-Final Office Action; Date Mailed: Dec. 23, 2014; 17 pages.
U.S. Appl. No. 13/833,952, filed Mar. 15, 2013, Final Office Action; Date Mailed: Apr. 16, 2015; 25 pages.
U.S. Appl. No. 13/833,952, filed Mar. 15, 2013; Non-FinalOffice Action; Date Mailed: Nov. 3, 2014; 39 pages.
U.S. Appl. No. 13/834,020, filed Mar. 15, 2013; Notice of Allowance; Date Mailed: Apr. 21, 2015; 10 pages.
U.S. Appl. No. 13/834,020, filed Mar. 15, 2013; Notice of Allowance, Date Mailed; Nov. 20, 2014; 26 pages.
U.S. Appl. No. 13/834,117, filed Mar. 15, 2013; Non-Final Office Action; Date Mailed: Feb. 26, 2015, 61 pages.
U.S. Appl. No. 13/834,502, filed Mar. 15, 2013; Non-Final Office Action; Date Mailed: Dec. 4, 2014; 37 pages.
U.S. Appl. No. 14/501,663, filed Sep. 30, 2014; Final Office Action; Date Mailed: Apr. 9, 2015; 25 pages.
U.S. Appl. No. 14/501,663, filed Sep. 30, 2014; Non-Final Office Action; Date Mailed: Dec. 19, 2014; 11 pages.
U.S. Appl. No. 14/501,945, filed Sep. 30, 2014; Non-Final Office Action, Date Mailed: Jan. 5, 2015; 29 pages.
U.S. Appl. No. 13/833,886, filed Mar. 15, 2013; Non-Final Office Action, Date Mailed: Aug. 3, 2015; 18 pages.
U.S. Appl. No. 13/833,952, filed Mar. 15, 2013; Non-Final Office Action, Date Mailed: Aug. 5, 2015; 25 pages.
U.S. Appl. No. 13/834,502, filed Mar. 15, 2013; Final Office Action; Date Mailed: Jun. 29, 2015; 26 pages.
U.S. Appl. No. 14/501,945, filed Sep. 30, 2014; Final Office Action: Date Mailed: Jul. 16, 2015; 30 pages.
U.S. Appl. No. 13/833,796, filed Mar. 15, 2013; Non-Final Office Action; Date Mailed: Jul. 30, 2015, 21 pages.
U.S. Appl. No. 13/834,117, filed Mar. 15, 2013; Final Office Action; Date Mailed: Jul. 17, 2015, 31 pages.
U.S. Appl. No. 13/833,796, filed Mar. 15, 2013; Final office action; Date Mailed: Jan. 15, 2016; 18 pages.
U.S. Appl. No. 13/834,117, filed Mar. 15, 2013; Non-final office Action; Date Mailed: Dec. 16, 2015; 30 pages.
U.S. Appl. No. 14/501,663, filed Sep. 30, 2014; Final office action; Date Mailed: Jan. 20, 2016; 15 pages.
U.S. Appl. No. 14/501,945, filed Sep. 30, 2014; Non-final Office Action; Date Mailed: Nov. 30, 2015; 22 pages.
Examination Report for Application No. GB1516352 Mailed Nov. 17, 2015, 3 pages.

* cited by examiner

VIRTUAL MACHINE MOBILITY USING OPENFLOW

DOMESTIC PRIORITY

This application is a continuation of U.S. patent application Ser. No. 13/834,502, filed Mar. 15, 2013, the content of which is incorporated by reference herein in its entirety.

BACKGROUND

The present invention relates generally to computer networks and, more specifically, to migrating virtual machines in a network.

Ethernet networks are typically employed in local area networks (LANs) that include a plurality of network switches. A number of communication protocols have been developed and continue to evolve to enhance Ethernet network performance for various environments. For example, an enhancement to Ethernet, called data center bridging (DCB), converged enhanced Ethernet (CEE) or data center Ethernet (DCE), supports the convergence of LANs with storage area networks (SANs). Other protocols that can be used in a data center environment in conjunction with Ethernet include, for instance, Fibre Channel over Ethernet (FCoE), Internet Wide Area Remote direct memory access Protocol (iWARP), Remote direct memory access over Converged Ethernet (RoCE).

Virtual machines (VMs) are often migrated within a data center from one processor to another processor in order, for example, to take advantage of unused processing cycles or other resources.

SUMMARY

An embodiment includes a method and computer program product for migrating virtual machines (VMs). The method includes creating a temporary storage area. The temporary storage area is created by a controller in a network that is in a first state. The configuration data for a VM is stored in the temporary storage area. The network is provisioned from the first state to a second state. The provisioning is by the controller and based on network locations of a source server and a target server. A message is transmitted to the target server. The message includes a request to migrate the VM from the source server to the target server, and an address of the temporary storage area. It is determined that the migration has completed and the temporary storage area is removed based on the determining that the migrant has completed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to migrating virtual machines (VMs) in a network. Embodiments described herein are directed to a process in an OpenFlow network for migrating a VM between a first host machine on which the VM is running and a second host machine. The process may include an OpenFlow controller within the OpenFlow network creating a mobility storage area within the OpenFlow controller for storing configuration data of the VM. The OpenFlow network may be provisioned from a first state to a second state, for migration of the VM to a second host. The provisioning may include determining the minimum number of paths (and identifying them by path identifiers) between the VM and the second host machine and reserving switch resources having the highest quality of service (QoS) and lowest available latency along those paths for the VM. A migration request with the identifiers of the paths from the first host machine to the second host machine may be transmitted. Responsive to receiving the migration request, the second host machine may read the configuration data of the VM. The migration of the VM to the second host machine may be completed by returning the network provisioning to its first state and destroying the mobility storage area in the controller.

Embodiments described herein are contrasted with contemporary methods of performing VM migration which include storing configuration data to a storage device, such as a direct access storage device (DASD) which is shared by multiple users. Reading and writing to storage devices requires more resources than reading and writing to the mobility storage area described herein. Storage devices are not located within the network (e.g., on the controller, on a switch) and therefore standard input/output (I/O) operations (e.g., via a storage controller on a processor) are required to access the configuration data; this takes longer than accessing the mobility storage area which is in the network. In addition, having the storage devices shared by multiple users may have an adverse impact on the speed that the configuration data may be accessed (e.g., written, read). In general, because of the storage capacity of a typical storage device and the relatively small size of configuration data for a VM it is not cost effective to have an entire storage device or channel dedicated to a VM migration. Embodiments described herein may be utilized to perform a VM migration that uses a dedicated (i.e., not shared with other users) temporary storage area located on a network element that is sized based on a current VM being migrated in order to provide an efficient and cost effective VM migration process.

Figure 1:
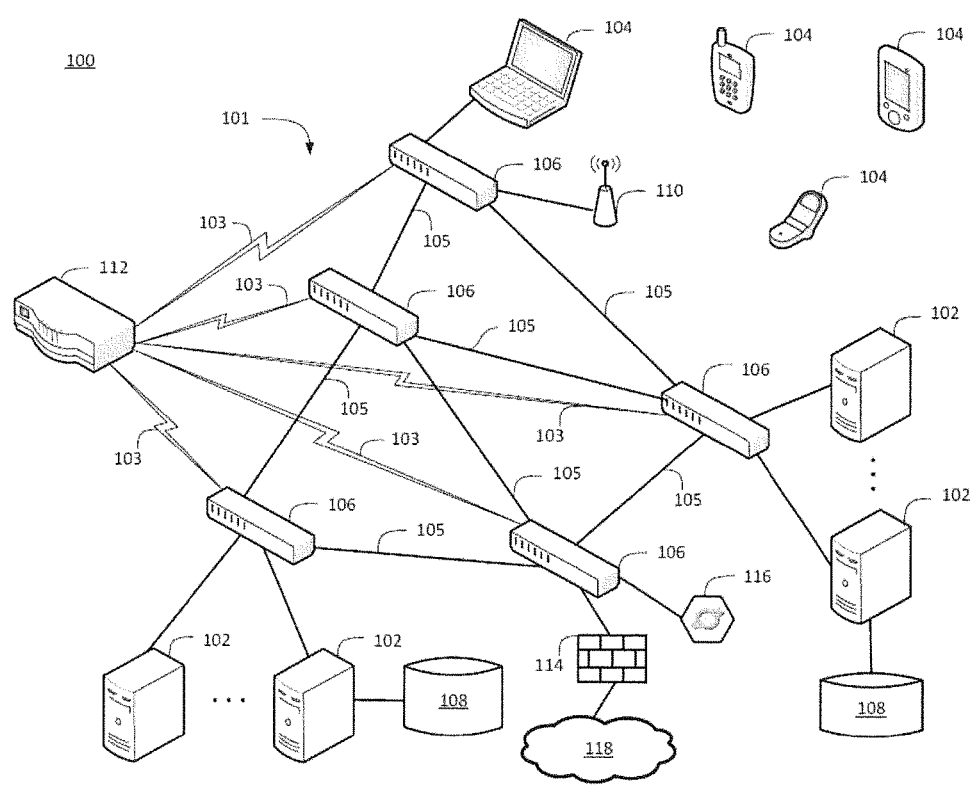
FIG. 1 depicts a block diagram of a system including a network with OpenFlow-capable switches that may be implemented according to an embodiment.

Turning now to FIG. 1, an example of a system 100 including a network 101 that supports OpenFlow will now be described in greater detail. In the example depicted in FIG. 1, the system 100 is a data center environment including a plurality of servers 102 and client systems 104 configured to communicate over the network 101 using switches 106 that are OpenFlow-capable. In exemplary embodiments, the servers 102, also referred as hosts or host systems, are high-speed processing devices (e.g., mainframe computers, desktop computers, laptop computers, hand-held devices, embedded computing devices, or the like) including at least one processing circuit (e.g., a computer processor/CPU) capable of reading and executing instructions, and handling interactions with various components of the system 100. The servers 102 may be storage system servers configured to access and store large amounts of data to one or more data storage systems 108. In an embodiment, a VM is migrated from one server 102 (referred to herein as a "source server") to another server 102 (referred to herein as a "target server").

The client systems 104 can include a variety of desktop, laptop, general-purpose computer devices, mobile computing devices, and/or networked devices with processing circuits and input/output (I/O) interfaces, such as keys/buttons, a touch screen, audio input, a display device and audio output. The client systems 104 can be linked directly to one or more of the switches 106 or wirelessly through one or more wireless access points 110.

The data storage systems 108 refer to any type of computer readable storage media and may include one or more secondary storage elements, e.g., hard disk drive (HDD), solid-state memory, tape, or a storage subsystem that is internal or external to the servers 102. Types of data that may be stored in the data storage systems 108 include, for example, various files and databases. There may be multiple data storage systems 108 utilized by each of the servers 102, which can be distributed in various locations of the system 100.

The system 100 also includes a network controller 112 that is a central software defined network controller configured to make routing decisions within the network 101. The network controller 112 establishes one or more secure links 103 to configure the switches 106 and establish communication properties of links 105 between the switches 106. For example, the network controller 112 can configure the switches 106 to control packet routing paths for data flows between the servers 102 and client systems 104, as well as one or more firewalls 114 and one or more load balancers 116. The one or more firewalls 114 restrict access and the flow of network traffic between the network 101 and one or more external networks 118. The one or more load balancers 116 can distribute workloads across multiple computers, such as between the servers 102.

The servers 102, client systems 104, and network controller 112 can include various computer/communication hardware and software technology known in the art, such as one or more processing units or circuits, volatile and non-volatile memory including removable media, power supplies, network interfaces, support circuitry, operating systems, and the like. Although the network controller 112 is depicted as a separate component, it will be understood that network configuration functionality can alternatively be implemented in one or more of the servers 102 or client systems 104 in a standalone or distributed format.

The network 101 can include a combination of wireless, wired, and/or fiber optic links. The network 101 as depicted in FIG. 1 represents a simplified example for purposes of explanation. Embodiments of the network 101 can include numerous switches 106 (e.g., hundreds) with dozens of ports and links per switch 106. The network 101 may support a variety of known communication standards that allow data to be transmitted between the servers 102, client systems 104, switches 106, network controller 112, firewalls(s) 114, and load balancer(s) 116. Communication protocols are typically implemented in one or more layers, such as a physical layer (layer-1), a link layer (layer-2), a network layer (layer-3), a transport layer (layer-4), and an application layer (layer-5). In exemplary embodiments, the network 101 supports OpenFlow as a layer-2 protocol. The switches 106 can be dedicated OpenFlow switches or OpenFlow-enabled general purpose switches that also support layer-2 and layer-3 Ethernet.

Figure 2:
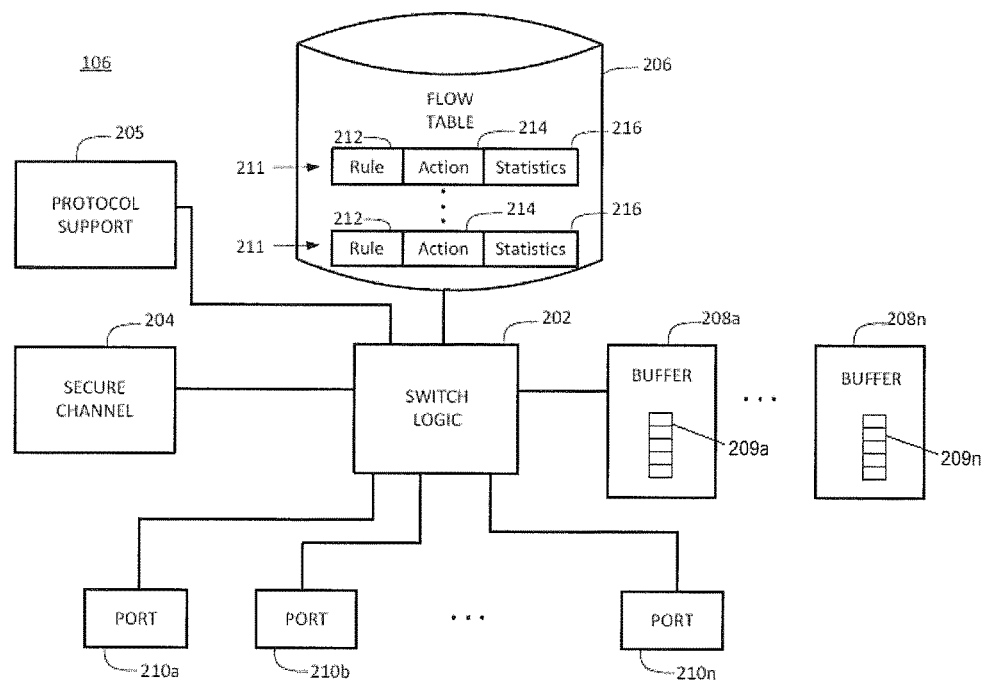
FIG. 2 depicts a block diagram of an OpenFlow-capable switch according to an embodiment.

FIG. 2 depicts a block diagram of the switch 106 of FIG. 1 that supports OpenFlow. The switch 106 includes switch logic 202, secure channel 204, protocol support 205, flow table 206, input/output buffers 208a-208n, port queues 209a-209n and ports 210a-210n. The switch logic 202 may be implemented in one or more processing circuits, where a computer readable storage medium is configured to hold instructions for the switch logic 202, as well as various variables and constants to support operation of the switch 106. The switch logic 202 forwards packets between the ports 210a-210n as flows defined by the network controller 112 of FIG. 1.

The secure channel 204 connects the switch 106 to the network controller 112 of FIG. 1. The secure channel 204 allows commands and packets to be communicated between the network controller 112 and the switch 106 via the OpenFlow protocol. The secure channel 204 can be implemented in software as executable instructions stored within the switch 106. Protocol details to establish a protocol definition for an implementation of OpenFlow and other protocols can be stored in the protocol support 205. The protocol support 205 may be software that defines one or more supported protocol formats. The protocol support 205 can be embodied in a computer readable storage medium, for instance, flash memory, which is configured to hold instructions for execution by the switch logic 202. Implementing the protocol support 205 as software enables updates in the field for new versions or variations of protocols and can provide OpenFlow as an enhancement to existing conventional routers or switches.

The flow table 206 defines supported connection types associated with particular addresses, virtual local area networks or switch ports, and is used by the switch to process data flows received at the switch. A data flow is a sequence of data packets grouped in some manner, e.g., by source and/or destination, or otherwise defined by selected criteria. Each data flow may be mapped to a port and associated queue based on the flow table 206. For example, a data flow is defined as all packets that match a particular header format.

Each entry 211 in the flow table 206 can include one or more rules 212, actions 214, and statistics 216 associated with a particular flow. The rules 212 define each flow, i.e., the packets that are part of the flow, and can be determined by packet headers. The actions 214 define how packets are processed. The statistics 216 track information such as the size of each flow (e.g., number of bytes), the number of packets for each flow, and time since the last matching packet of the flow or connection time. Examples of actions include instructions for forwarding packets of a flow to one or more specific ports 210a-210n (e.g., unicast or multicast), encapsulating and forwarding packets of a flow to the network controller 112 of FIG. 1, and dropping packets of the flow. Entries 211 in the flow table 206 can be added and removed by the network controller 112 of FIG. 1 via the secure channel 204. The network controller 112 of FIG. 1 can pre-populate the entries 211 in the flow table 206.

Additionally, the switch 106 can request creation of an entry 211 from the network controller 112 upon receiving a flow without a corresponding entry 211 in the flow table 206.

The buffers 208a-208n provide temporary storage in respective queues 209a-209n for flows as packets are sent between the ports 210a-210n. In a lossless configuration, rather than dropping packets when network congestion is present, the buffers 208a-208n temporarily store packets in the respective queues 209a-209n until the associated ports 210a-210n and links 105 of FIG. 1 are available. Each of the buffers 208a-208n may be associated with a particular port, flow, or sub-network. Each of the buffers 208a-208n is logically separate but need not be physically independent. Accordingly, when one of the buffers 208a-208n is full, it does not adversely impact the performance of the other buffers 208a-208n within the switch 106. Counters may be maintained for each queue and port.

For example, in an OpenFlow switch, each port 210a-210n is attached to a respective queue 209a-209n. In operation, when the switch 106 receives a packet, the switch 106 attempts to match the packet by comparing fields (referred to as "match fields") to corresponding fields in flow entries of each flow table 206. Exemplary match fields include ingress port and metadata fields, as well as header fields such as those described below in reference to FIG. 3. In one embodiment, matching starts at the first flow table and may continue to additional flow tables.

If no match is found, the switch 106 may perform an action based on the switch configuration, e.g., the packet may be forwarded to the controller or dropped. If the packet matches a flow entry in a flow table, the corresponding instruction set is executed based on the flow entry, e.g., the actions field 214. For example, when a packet is matched to a flow entry including an output action, the packet is forwarded to one of ports 210a-210n specified in the flow entry.

In one embodiment, forwarding the packet to a port includes mapping packets in a flow to a queue attached to the port. Such flows are treated according to the queue's configuration (e.g., minimum rate).

Figure 3:
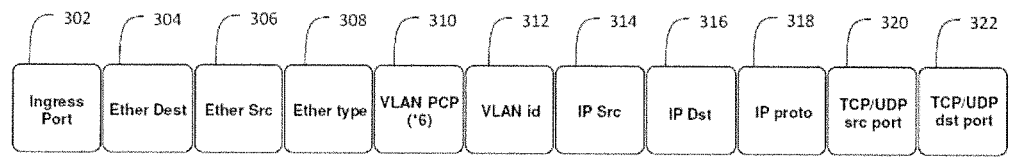
FIG. 3 depicts an example of an OpenFlow flow switching definition that can be used in embodiments.

FIG. 3 depicts an example of an OpenFlow flow switching definition 300 that can be used in embodiments. The OpenFlow flow switching definition 300 is a packet header that defines the flow and includes a number of fields. In this example, the switching definition 300 is a flow header that includes up to eleven tuples or fields; however, not all tuples need to be defined depending upon particular flows. In the example of FIG. 3, the OpenFlow flow switching definition 300 includes tuples for identifying an ingress port 302, an Ethernet destination address 304, an Ethernet source address 306, an Ethernet type 308, a virtual local area network (VLAN) priority 310, a VLAN identifier 312, an Internet protocol (IP) source address 314, an IP destination address 316, an IP protocol 318, a transmission control protocol (TCP)/user datagram protocol (UDP) source port 320, and a TCP/UDP destination port 322. The Ethernet destination address 304 may represent a layer-2 Ethernet hardware address or media access control (MAC) address used in legacy switching and routing. The IP destination address 316 may represent a layer-3 IP address used in legacy switching and routing. Flow switching can be defined for any combination of tuples in the OpenFlow flow switching definition 300, with a particular combination of tuples serving as a key. For example, flows can be defined in a rule 212 of FIG. 2 by exact matching or wildcard matching for aggregated MAC-subnets, IP-subnets, ports, VLAN identifiers, and the like.

Figure 4:
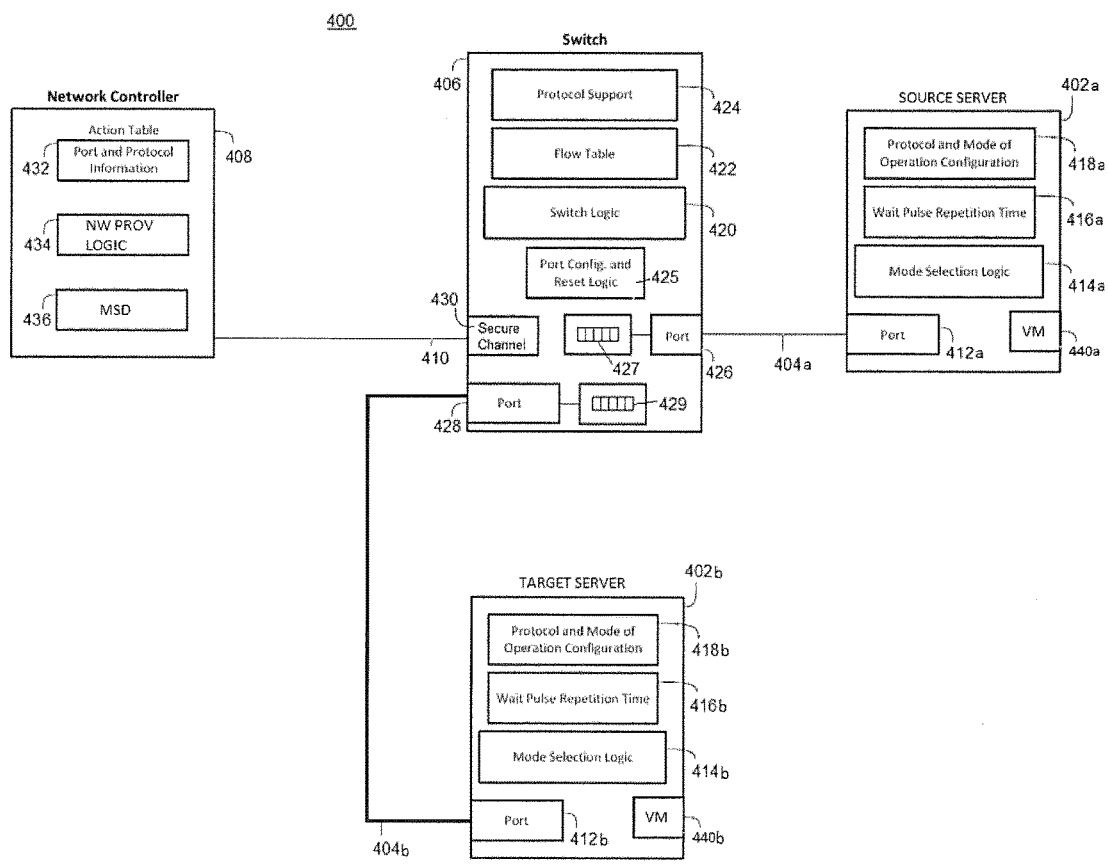
FIG. 4 depicts an exemplary embodiment of a portion of a network including a network switch, a network controller, and two servers.

FIG. 4 depicts a block diagram of a network portion 400. In the embodiment shown in FIG. 4, a source server 402a is coupled by a link 404a to a switch 406, and a target server 402b in coupled by a link 404b to the switch 406. An exemplary source server 402a and target server 402b is a server 102 of FIG. 1, and an exemplary switch 406 is a switch 106 of FIG. 1. A controller 408 (e.g., a network controller) is linked to the switch 406 by, e.g., a secure link 410. In one embodiment, in OpenFlow-capable environments, the controller is a network controller such as network controller 112 of FIG. 1. In other embodiments, for non-OpenFlow environments, functions of the controller 408 can be integrated into other network entities such as the source server 402a, the target server 402b, or server 102. Although only a single switch 406 is shown in the embodiment of FIG. 4, it is to be understood that the switch 406 may be a plurality of switches connected, e.g., to a central controller 408.

As shown in FIG. 4, the switch 406 is connected to the source server 402a and target server 402b, which both include at least one port 412a 412b and various logical components such as mode selection logic 414a 414b, wait pulse repetition time 416a 416b, and protocol and mode of operation configuration 418a 418b. Logical components described herein can be implemented in instructions stored in a computer readable storage medium for execution by a processing circuit or in hardware circuitry, and can be configured to send frames such as link initialization frames and data packets. The switch 406, source server 402a, target server 402b, and controller 408 may support a number of modes of operation including, but not limited to, Ethernet, Fibre Channel, Fibre Channel over Ethernet (FCoE), Internet Wide Area Remote direct memory access Protocol (iWARP), and Remote direct memory access over Converged Ethernet (RoCE).

The switch 406 includes switch logic 420, flow table 422, protocol support 424, port configuration and reset logic 425 and multiple ports, such as port 426 for communicating with the source server 402a and port 428 for communicating with the target server 402b, as well as other ports for communication with other network entities such as other switches or servers. The ports may be physical ports, virtual ports defined by the switch, and/or a virtual port defined by the OpenFlow protocol. Each port is attached or connected to a queue that holds data packets for a data flow when there is an imbalance between input rates and output rates of the data flow through the switch. For example, port 426 is attached to a queue 427 and port 428 is attached to a queue 429. When implemented as an OpenFlow switch, the switch 406 also includes a secure channel 430 for communicating with the network controller 408 on secure link 410.

The network controller 408 includes an action table 432 that holds port and protocol information for one or more switches, such as the switch 406 and/or the switches 106, as well as rules, actions, and statistics for flows through the switch 406 and other switches, such as switches 106 of FIG. 1. The network controller 408 also includes flow control logic including VM migration logic 434 that can be implemented in instructions stored in a computer readable storage medium for execution by a processing circuit or in hardware circuitry. The network controller 408 can manage updates of the flow table 422 in the switch 406. Based on the updating of the flow table 422, the port and protocol information in the action table 432 of the network controller 408 is updated to reflect the changes.

As indicated above, the network controller 408 communicates with the switch 406 via a secure link 410 established using a specified port, such as a port in a physical network controller 112 or a controller implemented in other processors, such as a server 102 or client system 104. The network controller 408 communicates with the switch 406 to configure and manage the switch, receive events from the switch and send packets out the switch. Various message types can be sent between the switch and the controller to accomplish such functions, including controller-to-switch, asynchronous and symmetric messages.

Controller-to-switch messages are initiated by the controller 408 and may or may not require a response from the switch 406. Features messages are used to request the capabilities of the switch 406 (e.g., upon establishment of the secure link), in response to which the switch 406 should return a features reply that specifies the capabilities of the switch 406. Configuration messages are sent by the controller 408 to set and query configuration parameters in the switch 406. The switch 406 only responds to a query from the controller 408. Modify-State messages are sent by the controller 408 to manage state on the switches, e.g., to add/delete and/or modify flows/groups in the flow table 422 and to set switch port properties. Read-State messages are used by the controller to collect statistics from the switch. Packet-out messages are used by the controller to send packets out of a specified port on the switch, and to forward packets received via Packet-in messages. Packet-out messages contain a full packet or a buffer ID referencing a packet stored in the switch. Packet-out messages also contain a list of actions to be applied in the order they are specified; an empty action list drops the packet.

Asynchronous messages are sent without the controller 408 soliciting them from the switch 406. The switch 406 sends asynchronous messages to the controller 408 to, e.g., denote a packet arrival, switch state change, or error. A packet-in event message may be sent to the controller 408 from the switch 406 for packets that do not have a matching flow entry, and may be sent from the controller 408 to the switch 406 for packets forwarded to the controller 408. Flow-removed messages are used to indicate that a flow entry has been removed due to, e.g., inactivity or expiration of the flow entry. Port-status messages are sent in response to changes in port configuration state and port status events. Error messages may be used by the switch 406 to notify the controller 408 of problems.

Symmetric messages are sent without solicitation, in either direction. Hello messages may be exchanged between the switch 406 and controller 408 upon connection startup. Echo request/reply messages can be sent from either the switch 406 or the controller 408, and can be used to measure the latency or bandwidth of a controller-switch connection, as well as verify its liveness. Experimenter messages provide a way for the switch 406 to offer additional functionality within the OpenFlow message type space.

An embodiment of the controller 408 includes VM migration logic 434 and a mobility storage area (MSA) 436 for implementing the VM migration process described herein. The MSA 436 is also referred to herein as a "temporary storage area." In an embodiment, the VM 440 in the source server 402*a* is migrated to the target server 402*b*. Though shown in FIG. 4 as being located on the controller 408, the MSA 436 may alternatively be located in the network on other network elements, such as the switch 406. In addition, the MSA 436 may be implemented by physical and/or virtual computer storage or memory. In an embodiment, the MSA 436 is created in response to instructions from the controller 408. The controller 408 may determine the size of the MSA based on the amount of space required to store the configuration data for the VM 440 being migrated. The controller 408 may perform the VM migration functions described herein in parallel for a plurality of switches.

The VM configuration data includes a set of attributes that defines the VM 440. Configuration data may include, but is not limited to: a number of dedicated processing cycles required, storage requirements, virtual I/O IP addresses (e.g., of an Ethernet card), shared storage location addresses, and information about applications to be executed on the VM 404, and/or applications to be executed on the VM 404.

In an embodiment, the controller 408 initiates a migration of the VM 440 from the source server 402*a* to the target server 402*b*. The VM migration logic 434 builds the MSA 436, determines a path from the source server 402*a* to the target server 402*b*, provisions the network based on the path, and the instructs the target server 402*b* to complete the migration. Once the migration is complete, the VM migration logic deletes the MSA 436 and un-provisions the network (e.g., breaks down the provisioned path from the source server 402*a* to the target server 402*b*, and returns to the network to a prior state).

Figure 5:
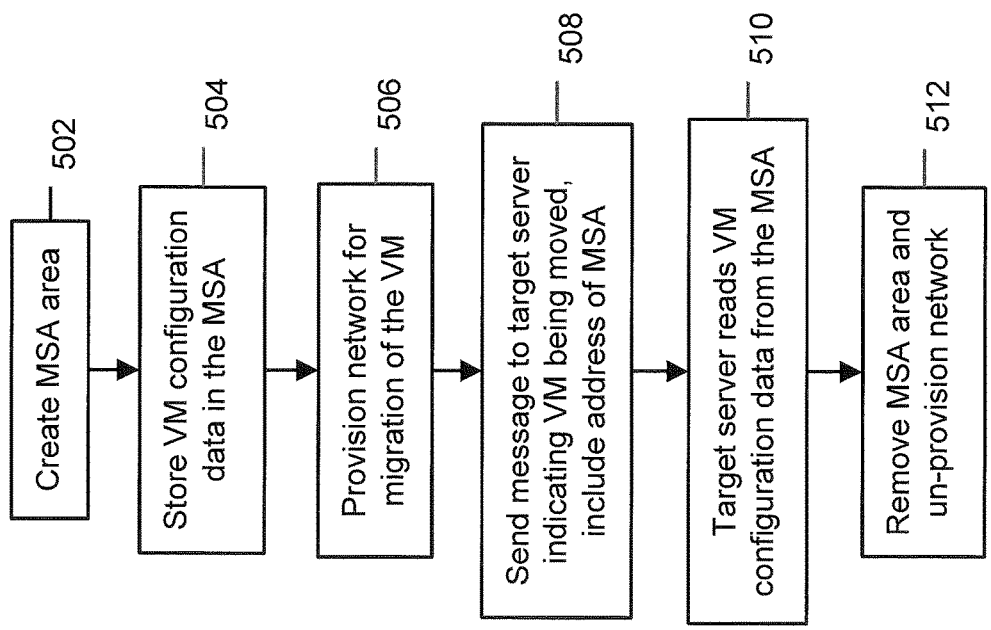
FIG. 5 is a flow diagram showing a virtual machine migration in a network in accordance with an embodiment.

FIG. 5 is a flow diagram showing a VM migration in a network in accordance with an embodiment. The processing shown in FIG. 5 may be performed by the VM migration logic 434 on the controller 408. At the start of the process shown in FIG. 5, the network is provisioned in a first state and a request to migrate a VM 440 from a source server 402*a* to a target server 402*b* is received. At block 502, a MSA 436 is created for storing configuration data related to the VM 440 being migrated. The MSA 436 is a temporary storage area dedicated to the migration of the VM 440 and it may be sized based on the amount of space required to store the configuration data for the VM 440. In an embodiment, the network is a software defined network such as an OpenFlow network. The MSA 436 may be located on any network element such as a controller 112 408 (as shown in FIG. 4) or a switch 106 406 in the network.

Referring now to block 504, the configuration data for the VM 440 is stored into the MSA 436. The network is provisioned by the controller 408 at block 506, going from the first state (prior to the migration) to a second state to support the migration. The network provisioning may be based on a variety of factors such as, but not limited to, the network locations of the source server 402*a* and the target server 402*b*, the size of the MSA 436, available bandwidth in the network, capacity of switches, and a specified quality of service. At block 508, a message is transmitted to the target server 402*b* telling the target server 402*b* of the planned migration of the VM 440. The message may include the address of the MSA 436 and network path identifiers (e.g., identifying switches) corresponding to the network provisioned at block 506. The processing at block 510 may be performed by software located on (or accessed by) the target server 402*b* and it includes reading the configuration data for the VM 440 from the MSA 436. The target server 402*b* may use the provisioned network path as defined by the network path identifiers to access the configuration data in the MSA 436. In an embodiment, the configuration data includes enough information for the target server 402*b* to execute the VM 440.

Once the target server 402*b* is executing the VM, the target server 402*b* may send a message back to the controller 408 indicting that the migration is complete. In response to receiving the notification, the VM migration logic 434 on the controller may remove (destroy) the MSA 436 and break down the network path built at block 506. The network may then move from the second state built at block 506 back to the first state or to some other state. Block 512 may also be performed if the controller 408 is notified that the migration has failed. In an embodiment, a retry of the migration would start at block 502.

As described herein, an OpenFlow controller may own the MSA 436 including such functions as create, resize, destroy, set time to live, and purge on link failure. The VM migration logic 434 is an example of a new OpenFlow primitive that may: provision the network for VM transfer, including functions such as reserving switch resources with a highest QoS and lowest available latency; send a VM mobility request to a recipient (e.g., target server 402b) including network path identifiers; provision the network to carry the VM to the destination (e.g., the target server 402b) to allow it to read the VM 440 directly from the MSA 436; and return the network to its prior state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for migrating virtual machines (VMs), the method comprising:
    creating, by a network controller located in a network, a temporary storage area in a memory of the network controller, the network in a first state;
    storing configuration data for a VM, the storing in the temporary storage area, temporary storage area dedicated to the VM and not shared with other users, the temporary storage area sized based on an amount of space required to store the configuration data;
    provisioning the network from the first state to a second state, the provisioning by the controller and based on network locations of a source server and a target server;
    transmitting a message to the target server, the message including:
        a request to migrate the VM from the source server to the target server; and
        an address of the temporary storage area;
    determining that the migration has completed; and
    removing the temporary storage area based on the determining.

2. The method of claim 1, further comprising provisioning the network from the second state back to the first state based on the determining.

3. The method of claim 1, wherein the migration includes reading, by the target server, the configuration data stored in the temporary storage area.

4. The method of claim 1, wherein the network is an OpenFlow network.

5. The method of claim 1, wherein the provisioning is further based on at least one of a size of the configuration data, available bandwidth in the network, and a specified quality of service.

6. The method of claim 1, wherein application information associated with the VM is also stored in the temporary storage area and migrated to the target server.

7. A computer program product for migrating virtual machines (VMs), the computer program product comprising:
    a non-transitory storage medium readable by a processing circuit and storing instructions for execution by the processing circuit for performing a method comprising:
    creating, by a network controller located in a network, a temporary storage area in a memory of the network controller, the network in a first state;
    storing configuration data for a VM, the storing in the temporary storage area, the temporary storage area dedicated to the VM and not shared with other users, the temporary storage area sized based on an amount of space required to store the configuration data;
    provisioning the network from the first state to a second state, the provisioning by the controller and based on network locations of a source server and a target server;
    transmitting a message to the target server, the message including:
        a request to migrate the VM from the source server to the target server; and
        an address of the temporary storage area;
    determining that the migration has completed; and
    removing the temporary storage area based on the determining.

8. The computer program product of claim 7, wherein the method further comprises provisioning the network from the second state back to the first state based on the determining.

9. The computer program product of claim 7, wherein the migration includes reading, by the target server, the configuration data stored in the temporary storage area.

10. The computer program product of claim 7, wherein the network is an OpenFlow network.

11. The computer program product of claim 7, wherein the provisioning is further based on at least one of a size of the configuration data, available bandwidth in the network, and a specified quality of service.

12. The computer program product of claim 7, wherein application information associated with the VM is also stored in the temporary storage area and migrated to the target server.

13. A method for migrating virtual machines (VMs), the method comprising:
    creating, by a network controller located in a network, a temporary storage area in a memory of a switch located in the network, the network in a first state;
    storing configuration data for a VM, the storing in the temporary storage area, temporary storage area dedicated to the VM and not shared with other users, the temporary storage area sized based on an amount of space required to store the configuration data;

provisioning the network from the first state to a second state, the provisioning by the controller and based on network locations of a source server and a target server;

transmitting a message to the target server, the message including:
 a request to migrate the VM from the source server to the target server; and
 an address of the temporary storage area;

determining that the migration has completed; and removing the temporary storage area based on the determining.

* * * * *